United States Patent
Oh et al.

(10) Patent No.: US 9,416,994 B2
(45) Date of Patent: Aug. 16, 2016

(54) COOLING AND HEATING CUP HOLDER

(71) Applicants: Hyundai Motor Company, Seoul (KR); Kbautotech Co., Ltd., Asan-si (KR)

(72) Inventors: Man Ju Oh, Yongin-si (KR); Jae Woong Kim, Hwaseong-si (KR); Jae Woo Park, Ansan-si (KR); Jae Hoon Kim, Cheonan-si (KR)

(73) Assignees: Hyundai Motor Company, Seoul (KR); Kbautotech Co., Ltd., Asan-si (KR)

( * ) Notice: Subject to any disclaimer, the term of this patent is extended or adjusted under 35 U.S.C. 154(b) by 327 days.

(21) Appl. No.: 14/020,041

(22) Filed: Sep. 6, 2013

(65) Prior Publication Data
US 2014/0352326 A1   Dec. 4, 2014

(30) Foreign Application Priority Data
Jun. 3, 2013 (KR) .................. 10-2013-0063384

(51) Int. Cl.
| F25B 21/02 | (2006.01) |
| F25B 21/04 | (2006.01) |
| B60N 3/10  | (2006.01) |

(52) U.S. Cl.
CPC .............. *F25B 21/04* (2013.01); *B60N 3/104* (2013.01); *F25B 2321/025* (2013.01); *F25D 2331/808* (2013.01); *F25D 2331/809* (2013.01)

(58) Field of Classification Search
CPC ...... F25B 21/02; H01L 35/30; B60H 1/00478
USPC .................... 62/3.2, 3.3, 3.6, 3.64
See application file for complete search history.

(56) References Cited

U.S. PATENT DOCUMENTS

| 5,720,171 | A | 2/1998 | Osterhoff et al. | |
| 6,755,026 | B2* | 6/2004 | Wallach | A61M 1/369 607/106 |
| 6,942,018 | B2* | 9/2005 | Goodson | F04B 19/006 165/104.21 |
| 7,134,486 | B2* | 11/2006 | Santiago | B01D 19/0031 165/104.28 |
| RE41,295 | E | 5/2010 | Cauchy | |
| 2005/0083657 | A1* | 4/2005 | Hamman | F28D 15/00 361/699 |
| 2005/0126184 | A1* | 6/2005 | Cauchy | F25B 21/02 62/3.3 |
| 2005/0274120 | A1* | 12/2005 | Quisenberry | F28D 15/0233 62/3.7 |
| 2006/0283577 | A1* | 12/2006 | Liu | F28D 15/043 165/104.26 |
| 2009/0038317 | A1* | 2/2009 | Otey | F25B 21/04 62/3.2 |

FOREIGN PATENT DOCUMENTS

| KR | 10-0356398 B1 | 10/2002 |
| KR | 2002-0088279 A | 11/2002 |
| KR | 10-2006-0058350 A | 5/2006 |
| KR | 10-0846832 B1 | 7/2008 |
| KR | 10-2012-0138894 A | 12/2012 |
| KR | 10-2013-0017655 A | 2/2013 |

*Primary Examiner* — Melvin Jones
(74) *Attorney, Agent, or Firm* — Morgan, Lewis & Bockius LLP

(57) ABSTRACT

A cooling and heating cup holder includes: a pair of holder bodies; a pair of thermoelectric elements having first and second surfaces for heat absorption and heat generation, the first surfaces being installed on the holder bodies; a pair of heat exchange pins provided so as to exchange heat with the second surfaces of the respective thermoelectric elements; a blower disposed at one side of the heat exchange pins and heat-radiating the heat exchange pins; and an extension heat pipe thermally connecting the second surfaces of the respective thermoelectric elements to each other or thermally connecting the respective heat exchange pins to each other.

12 Claims, 5 Drawing Sheets

COOLING AND HEATING CUP HOLDER

CROSS-REFERENCE TO RELATED APPLICATION

The present application claims priority of Korean Patent Application Number 10-2013-0063384 filed Jun. 3, 2013, the entire contents of which application is incorporated herein for all purposes by this reference.

BACKGROUND OF INVENTION

1. Field of Invention

The present invention relates to a cooling and heating cup holder capable of storing a cup and performing cooling or heating by being mounted in a vehicle, or the like.

2. Description of Related Art

A vehicle, or the like, is provided with a cup holder. This cup holder generally has only a simple holding function. However, in some vehicles, a cup holder having a cooling or heating function has been introduced.

The cup holder according to the related art generally is in charge of cooling or heating simply using only heat conduction. However, sufficient cooling or heating may not be performed using only the heat conduction.

FIG. 1 shows a cooling and heating cup holder according to the related art. The cup holder according to the related art has used a Peltier element 20, but was in charge of cooling or heating of a cup stored therein only by thermoelectricity through conduction to a cup holder body 10.

However, in this technology, in the case in which a contact area between the cup and the cup holder is small, the cooling or heating function through the heat conduction is not appropriately performed. That is, sizes of the cup and the cup holder do not always coincide with each other, and the cup may have a dented lower surface. In the case of a cup made of paper having low thermal conductivity, there was a tendency that heat transfer according to conduction is not substantially generated, such that a temperature coincides with an ambient temperature.

Therefore, a cup holder capable of appropriately implementing a substantial cooling or heating function by solving these problems has been demanded.

In addition, U.S. Pat. No. 5,720,171 entitled "Device for Heating and Cooling Beverage" has also suggested a cup holder. However, also in U.S. Pat. No. 5,720,171, the cooling or heating function of the cup holder was implemented only through conduction, such that substantial cooling or heating efficiency was significantly low.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a cooling and heating cup holder capable of implementing a substantial cooling or heating function by adding an air conditioning scheme more excellent than a heat conduction scheme.

According to various aspects of the present invention, there is provided a cooling and heating cup holder including: a pair of holder bodies; a pair of thermoelectric elements having first and second surfaces for heat absorption and heat generation, the first surfaces being installed on the holder bodies; a pair of heat exchange pins provided so as to exchange heat with the second surfaces of the respective thermoelectric elements; a blower disposed at one side of the heat exchange pins and heat-radiating the heat exchange pins; and an extension heat pipe thermally connecting the second surfaces of the respective thermoelectric elements to each other or thermally connecting the respective heat exchange pins to each other.

The pair of heat exchange pins may be spaced apart from each other by a predetermined distance and have the extension heat pipe disposed therebetween, and the extension heat pipe may have one end portion closely adhered to one heat exchange pin, a bent central portion, and the other end portion closely adhered to the other heat exchange pin.

One surfaces of the pair of heat exchange pins facing the thermoelectric elements may be provided with the extension heat pipe traversing the respective heat exchange pins to thermally connect the respective heat exchange pins to each other, and the second surfaces of the respective thermoelectric elements may be closely adhered to the extension heat pipe to thermally connect the respective thermoelectric elements to each other.

The cooling and heating cup holder may further include a pair of transfer heat pipes having one ends connected to the second surfaces of the thermoelectric elements, extended, and having the other ends connected to the heat exchange pins.

Both ends of the extension heat pipe may be connected to the respective transfer heat pipes.

According to various aspects of the present invention, there is provided a cooling and heating cup holder including: a pair of holder bodies; a pair of thermoelectric elements having first and second surfaces for heat absorption and heat generation, the first surfaces being installed on the holder bodies; a pair of heat exchange pins provided so as to exchange heat with the second surfaces of the respective thermoelectric elements; a blower disposed at one side of the heat exchange pins and heat-radiating the heat exchange pins; an extension heat pipe thermally connecting the second surfaces of the respective thermoelectric elements to each other or thermally connecting the respective heat exchange pins to each other; a pair of auxiliary thermoelectric elements provided in a space between the pair of holder bodies and having first surfaces closely adhered to the holder bodies adjacent thereto, respectively, and second surfaces disposed to face each other; and auxiliary heat pipes thermally connecting the second surfaces of the respective auxiliary thermoelectric elements and the respective heat exchange pins to each other.

Sides of the pair of thermoelectric elements may be provided with fans, respectively, and air blown from the fans may be conditioned through the first surfaces of the thermoelectric elements and be then introduced into and convected in the holder bodies.

The cooling and heating cup holder may further include a pair of transfer heat pipes having one ends connected to the second surfaces of the thermoelectric elements, extended, and having the other ends connected to the heat exchange pins.

The second surfaces of the pair of thermoelectric elements may be installed with heat radiation pins, respectively, one ends of the transfer heat pipes may be connected to the respective heat radiation pins, and both ends of the extension heat pipe may be connected to the respective heat radiation pins.

The cooling and heating cup holder may further include an auxiliary heat radiation pin disposed between the pair of auxiliary thermoelectric elements and having both sides closely adhered to the second surfaces of the auxiliary thermoelectric elements facing each other.

The auxiliary heat pipes may be configured as a pair and have one ends connected to the auxiliary heat radiation pin and the other ends connected to the respective heat exchange pins.

An extension heat exchange pin may be disposed between the pair of heat exchange pins.

The present methods and apparatuses have other features and advantages apparent from the accompanying drawings, incorporated herein, and below Detailed Description, which together serve to explain certain principles of the present invention.

DETAILED DESCRIPTION

Figure 1:
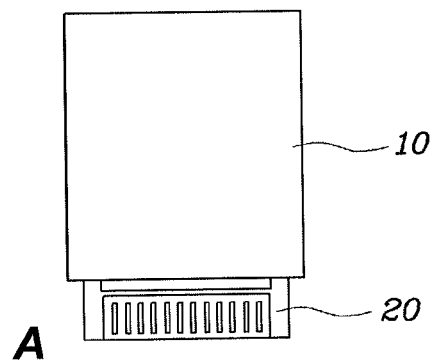
FIG. 1 is a view showing a cooling and heating cup holder according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIGS. 2 to 8 are views showing a cooling and heating cup holder according to various embodiments of the present invention. The cooling and heating cup holder according to various embodiments of the present invention includes a pair of holder bodies 100 and 100'; a pair of thermoelectric elements 200 and 200' having first and second surfaces for heat absorption and heat generation, the first surfaces being installed on the holder bodies 100 and 100'; a pair of heat exchange pins 400 and 400' provided so as to exchange heat with the second surfaces of the respective thermoelectric elements 200 and 200'; a blower 500 disposed at one side of the heat exchange pins 400 and 400' and heat-radiating the heat exchange pins 400 and 400'; and an extension heat pipe 300 thermally connecting the second surfaces of the respective thermoelectric elements 200 and 200' to each other or thermally connecting the respective heat exchange pins 400 and 400' to each other.

Figure 2:
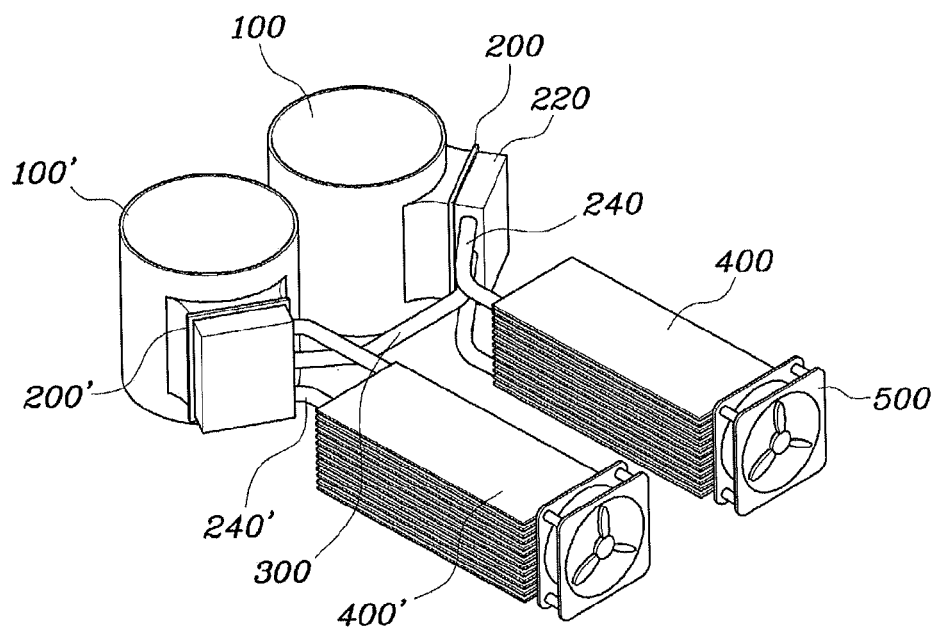
FIGS. 2, 3, 4, 5, 6, 7 and 8 are views showing a cooling and heating cup holder according to various exemplary embodiments of the present invention.

Describing various embodiments shown in FIG. 2, the pair of holder bodies 100 and 100' are first provided. The holder bodies 100 and 100' have cups stored therein to perform cooling or heating, which is basically based on operations of the thermoelectric elements 200 and 200'. The thermoelectric elements 200 and 200' have the first and second surfaces for heat absorption and heat radiation and are provided as a pair so as to correspond to the respective holder bodies 100 and 100' by having the first surfaces installed on the holder bodies 100 and 100'. It is obvious that in the case in which one pair or more of holder bodies 100 and 100' are provided, the numbers of each component to be described below correspond to that of holder bodies.

Figure 8:
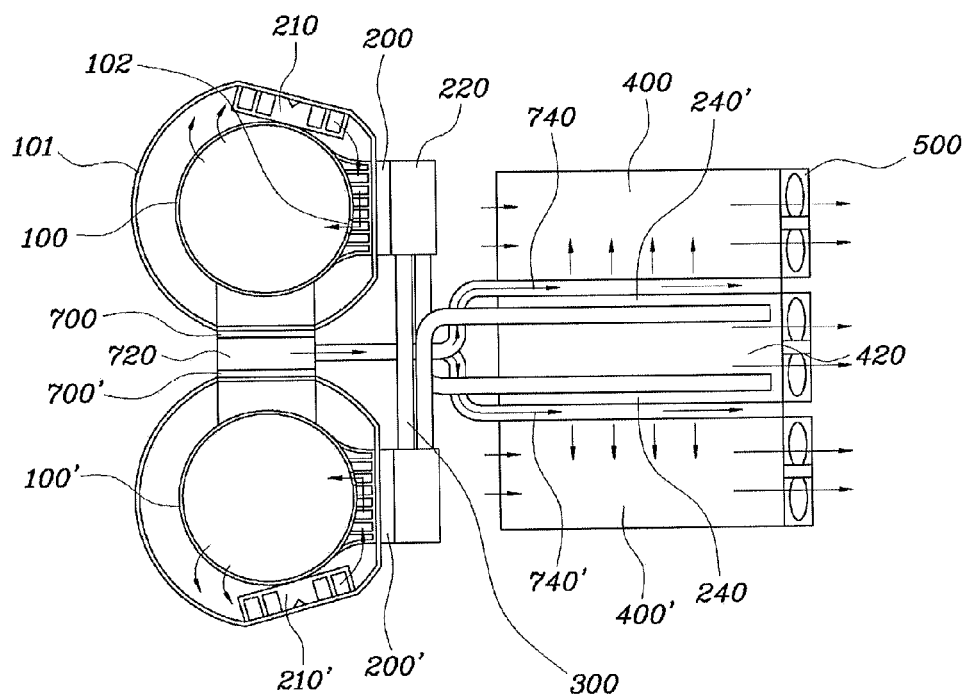

Meanwhile, in order to cool or heat the cups stored in the holder bodies 100 and 100', there may be a method of cooling and heating metallic holder bodies 100 and 100' themselves through the first surfaces of the thermoelectric elements 200 and 200', thereby cooling or heating the cups using heat conduction. However, cooling or heating using convection heat transfer as shown in FIG. 8 is effective in that contact areas between the cups and the holder bodies 100 and 100' are not large. This will be described with respect to FIG. 8 below.

Meanwhile, the pair of heat exchange pins 400 and 400' are provided so as to exchange heat with the second surfaces of the respective thermoelectric elements 200 and 200', and the blower 500 disposed at one side of the heat exchange pins 400 and 400' and heat-radiating the heat exchange pins 400 and 400' is provided. The heat exchange pins 400 and 400' include a plurality of pins stacked so as to form a rectangular box shape, thereby making it possible to increase a heat transfer area, and the number of blowers 500 may correspond to that of each heat exchange pin 400 and 400' or a single large blower may be provided. The thermoelectric elements 200 and 200' cool or heat the holder bodies 100 and 100' through the first surfaces thereof. Therefore, opposite heat should be rapidly removed for the cooling and heating cup holder according to various embodiments of the present invention to serve as a substantial cooling and heating cup holder. Therefore, in order to remove the opposite heat, the heat exchange pins 400 and 400' and the blower 500 are provided at one sides of the holder bodies 100 and 100'.

In addition, the extension heat pipe 300 is provided to thermally connect the second surfaces of the respective thermoelectric elements 200 and 200' to each other or thermally connect the respective heat exchange pins 400 and 400' to each other. That is, the heat pipe is to transfer or dissipate heat from one side thereof to the other side thereof at a supersonic speed. Therefore, even in the case on which only cooling or heating of one holder body 100 is performed only using one thermoelectric element 200, both heat exchange pins 400 and 400' are used, thereby making it possible to rapidly remove the opposite heat.

Alternatively, since the second surfaces of the respective thermoelectric elements 200 and 200' are dissipated so as to be in thermally parallel with each other by the extension heat pipe 300, both of the heat exchange pins 400 and 400' are used through the second surfaces of the respective thermoelectric elements 200 and 200'. As a result, even in the case of using only one thermoelectric element 200, both of the two heat exchange pins 400 and 400' may be used, such that a heat radiation area may be significantly increased, which doubly increases efficiency of the thermoelectric element 200 and cooling or heating speed of the cooling and heating cup holder.

Figure 3:
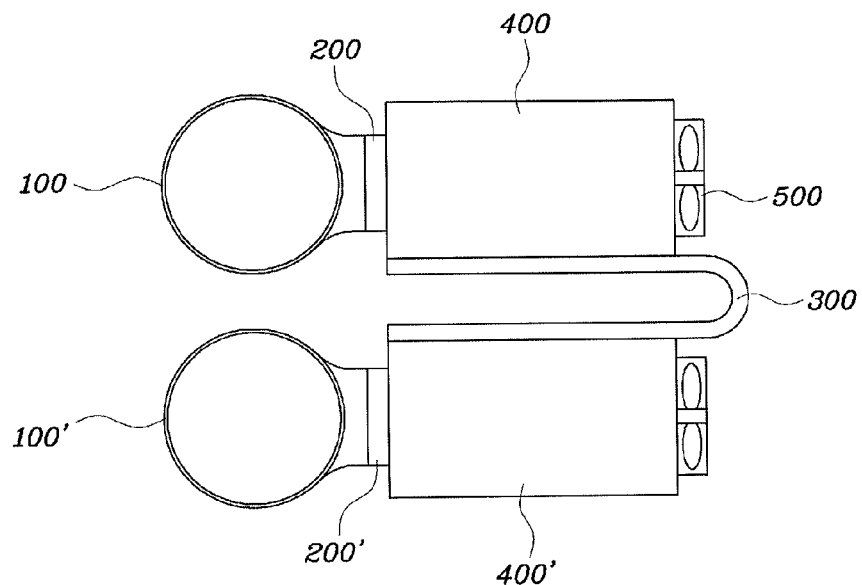
Figure 4:
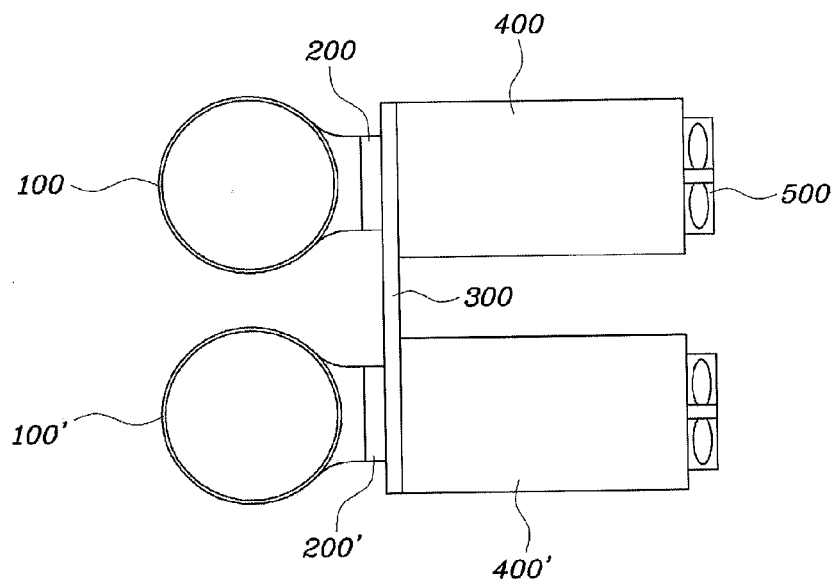
Figure 5:
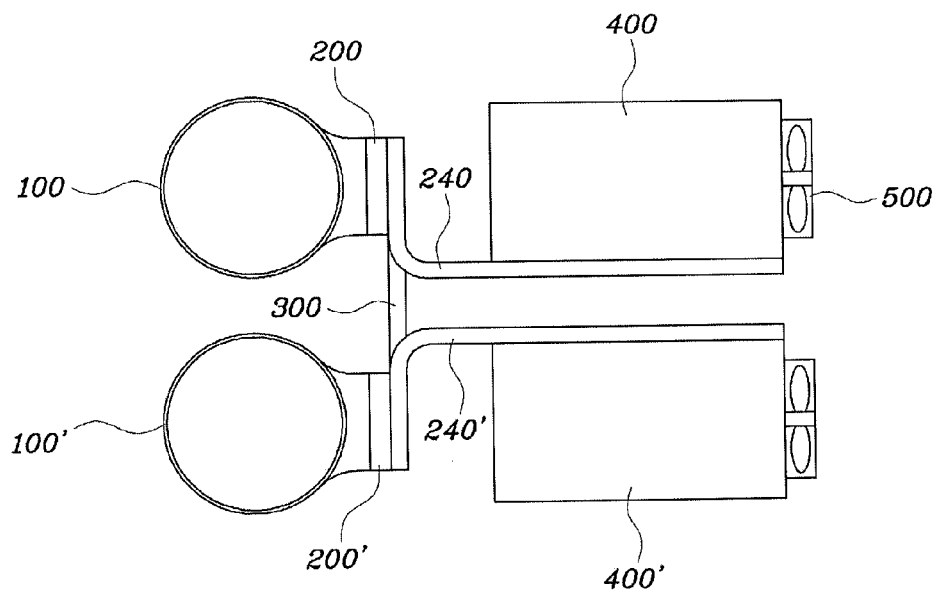

In addition, as shown in FIG. 3, the pair of heat exchange pins 400 and 400' are spaced apart from each other by a predetermined distance and has the extension heat pipe 300 disposed therebetween, and the extension heat pipe 300 has one end portion closely adhered to one heat exchange pin 400, a bent central portion, and the other end closely adhered to the other heat exchange pin 400'. This is also to allow both heat exchange pins 400 and 400' to dissipate the heat with each other to be in parallel with each other, thereby doubly increasing an area of heat conduction.

In addition, one surfaces of the pair of heat exchange pins 400 and 400' facing the thermoelectric elements 200 and 200' may be provided with the extension heat pipe 300 traversing the respective heat exchange pins 400 and 400' to thermally connect the respective heat exchange pins 400 and 400' to each other, and the second surfaces of the respective thermoelectric elements 200 and 200' may be closely adhered to the extension heat pipe 300 to thermally connect the respective thermoelectric elements 200 and 200' to each other. In this case shown in FIG. 4, the second surface of the thermoelectric element 200 may discharge the opposite heat to both of the heat exchange pins 400 and 400'. In this case, it will be advantageous that the extension heat pipe 300 has a plate shape in which it has a predetermined area to surface-contact the second surfaces of the thermoelectric elements 200 and 200'.

Meanwhile, a pair of transfer heat pipes 240 and 240' having one ends connected to the second surfaces of the thermoelectric elements 200 and 200', extended, and having the other ends connected to the heat exchange pins 400 and 400' may also be provided. This, which is shown in FIG. 2, is very useful in the case in which the holder bodies 100 and 100' and the heat exchange pins 400 and 400' cannot but be spaced apart from each other by a predetermined distance. Through the above-mentioned structure, basically, the respective thermoelectric elements 200 and 200' may not only perform heat radiation to the heat exchange pins 400 and 400' corresponding thereto through the transfer heat pipes 240 and 240', but also use the transfer heat pipes 240 and 240' and the heat exchange pins 400 and 400' disposed at the other side through the extension heat pipe 300.

Figure 6:
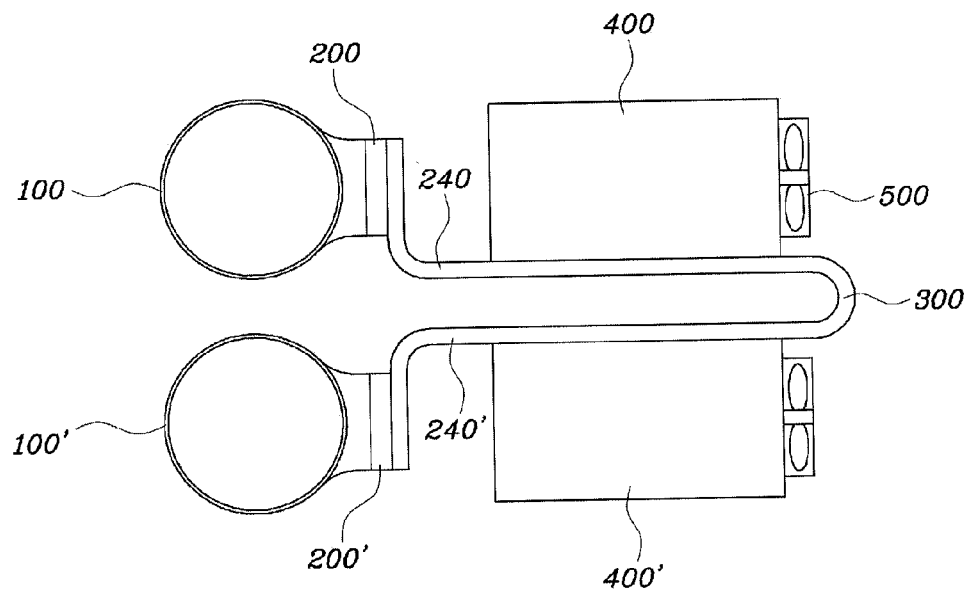

In addition, both ends of the extension heat pipe 300 may be connected to the respective transfer heat pipes 240 and 240'. In this case corresponding to FIG. 5, there is an advantage that a length of the heat pipe may be decreased. In addition, as shown in FIG. 6, it is possible to connect both ends of the extension heat pipe 300 to the respective heat exchange pins 400 and 400' in that a heat radiation area is increased.

Figure 7:
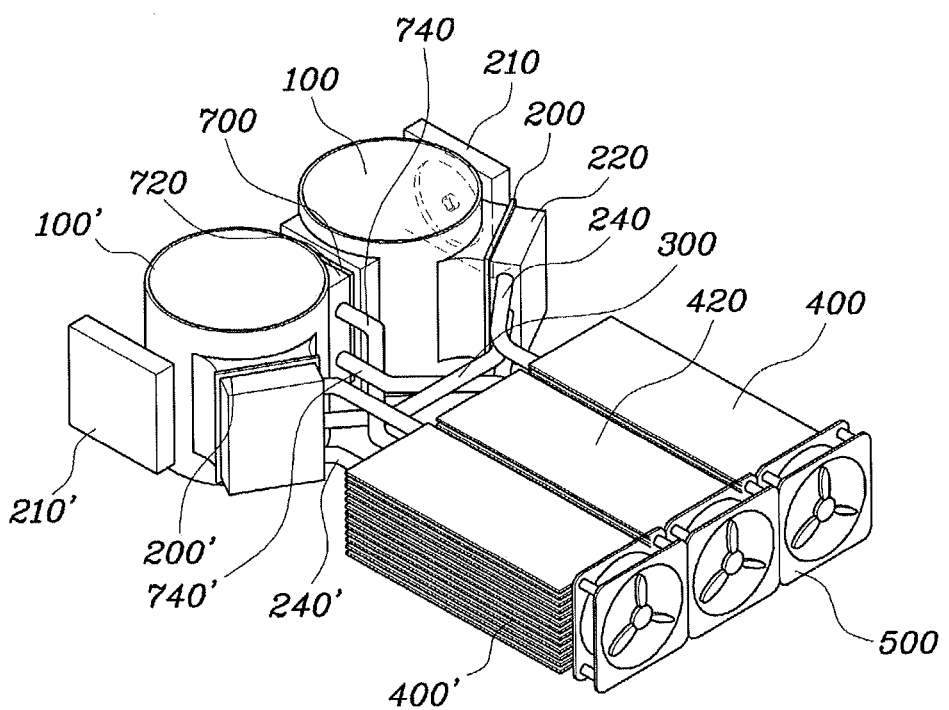

Meanwhile, FIGS. 7 and 8 are views showing a cooling and heating cup holder according to various embodiments of the present invention. The cooling and heating cup holder according to various embodiments of the present invention includes a pair of holder bodies 100 and 100'; a pair of thermoelectric elements 200 and 200' having first and second surfaces for heat absorption and heat generation, the first surfaces being installed on the holder bodies 100 and 100'; a pair of heat exchange pins 400 and 400' provided so as to exchange heat with the second surfaces of the respective thermoelectric elements 200 and 200'; a blower 500 disposed at one side of the heat exchange pins 400 and 400' and heat-radiating the heat exchange pins 400 and 400'; an extension heat pipe 300 thermally connecting the second surfaces of the respective thermoelectric elements 200 and 200' to each other or thermally connecting the respective heat exchange pins 400 and 400' to each other; a pair of auxiliary thermoelectric elements 700 and 700' provided in a space between the pair of holder bodies 100 and 100' and having first surfaces closely adhered to the holder bodies 100 and 100' adjacent thereto, respectively, and second surfaces disposed to face each other; and auxiliary heat pipes 740 and 740' thermally connecting the second surfaces of the respective auxiliary thermoelectric elements 700 and 700' and the respective heat exchange pins 400 and 400' to each other.

That is, the cooling and heating cup holder according to various embodiments of the present invention is characterized in that it includes the pair of auxiliary thermoelectric elements 700 and 700' provided in the space between the pair of holder bodies 100 and 100' and having the first surfaces closely adhered to the holder bodies 100 and 100' adjacent thereto, respectively, and the second surfaces disposed to face each other; and the auxiliary heat pipes 740 and 740' thermally connecting the second surfaces of the respective auxiliary thermoelectric elements 700 and 700' and the respective heat exchange pins 400 and 400' to each other.

The pair of holder bodies 100 and 100' include the thermoelectric elements 200 and 200' mainly operated, respectively, to perform cooling or heating, and the respective auxiliary thermoelectric elements 700 and 700' are provided in a small space between the holder bodies 100 and 100' in order to improve a cooling or heating function. The auxiliary thermoelectric elements 700 and 700' are provided in the space between the pair of holder bodies 100 and 100', have the first surfaces closely adhered to the holder bodies 100 and 100' adjacent thereto, respectively, and the second surfaces disposed to face each other, and mainly contact directly the holder bodies 100 and 100' to cool or heat the holder bodies 100 and 100' using heat conduction, thereby allowing air circulated in the holder bodies 100 and 100' to be cooled or heated to increase cooling or heating efficiency.

Meanwhile, the auxiliary heat pipes 740 and 740' thermally connecting the second surfaces of the respective auxiliary thermoelectric elements 700 and 700' and the respective heat exchange pins 400 and 400' to each other are provided to perform heat radiation of the auxiliary thermoelectric elements 700 and 700' together with the heat exchange pins 400 and 400'.

In addition, sides of the pair of thermoelectric elements 200 and 200' may be provided with fans 210 and 210', respectively, and air blown from the fans 210 and 210' may be conditioned through the first surfaces of the thermoelectric elements 200 and 200' and be then introduced into and convected in the holder bodies 100 and 100'. Basically, main thermoelectric elements 200 and 200' are to cool or heat cups embedded in the holder bodies 100 and 100' through convection heat transfer. Therefore, as shown in FIG. 8, an external housing 101 enclosing the holder bodies 100 and 100' is installed, and the fan 210 and the thermoelectric element 200 are provided between the external housing 101 and the holder body 100.

The fans 210 and 210' suck air and then discharge the air to the thermoelectric elements 200 and 200', and the discharged air is conditioned while passing through the first surfaces of the thermoelectric elements 200 and 200' and is then introduced into the holder bodies 100 and 100' through throughholes of the holder bodies 100 and 100'. In addition, the introduced conditioned air moves while enclosing the cups, and is then introduced again into the fans 210 and 210' to cool or heat the cups while enclosing the cups by convention heat transfer. Since the cup has various shapes, efficiency may be improved as compared with a conduction scheme according to the related art.

In addition, according to various embodiments of the present invention, the holder bodies 100 and 100' themselves may be further cooled or heated through the auxiliary thermoelectric elements 700 and 700', such that the air enclosing the cups in the holder bodies may be further cooled or heated, as described above.

Meanwhile, a pair of transfer heat pipes 240 and 240' having one ends connected to the second surfaces of the thermoelectric elements 200 and 200', extended, and having the other ends connected to the heat exchange pins 400 and 400' are provided. In addition, the second surfaces of the pair of thermoelectric elements 200 and 200' may be installed with heat radiation pins 220, respectively, one ends of the transfer heat pipes 240 and 240' may be connected to the respective heat radiation pins 220, and both ends of the extension heat pipe 300 may be connected to the respective heat radiation pins 220.

Further, an auxiliary heat radiation pin 720 disposed between the pair of auxiliary thermoelectric elements 700 and 700' and having both sides closely adhered to the second surfaces of the auxiliary thermoelectric elements 700 and 700' facing each other may be provided, and the auxiliary heat pipes 740 and 740' may be configured as a pair and have one ends connected to the auxiliary heat radiation pin 720 and the other ends connected to the respective heat exchange pins 400 and 400'. In addition, an extension heat exchange pin 420 may be disposed between the pair of heat exchange pins 400 and 400'.

Through the above-mentioned structure, at the time of cooling or heating of one holder body 100, both of the main thermoelectric element 200 and the auxiliary thermoelectric element 700 perform the heat radiation using both heat exchange pins 400 and 400' through the transfer heat pipes 240 and 240', the extension heat pipe 300, and the auxiliary heat pipes 740 and 740', such that cooling or heating efficiency and heat radiation efficiency of the holder bodies 100 and 100' themselves are increased, thereby making it possible to implement cooling or heating performance significantly higher as compared with the related art.

With the cooling and heating cup holder having the structure as described above, at the time of using one of two or more cup holders, performance two times or more higher as compared with the related art may be implemented, and heat generated from the thermoelectric element is uniformly and rapidly transferred to a heat radiating part, thereby making it possible to improve performance of the cup holder.

In addition, thermoelectric efficiency is improved, thereby making it possible to decrease a size of the heat radiation pin occupying the largest volume in a cup holder system and decrease current consumption of the blower.

Further, a fast effect property and performance are improved, thereby making it possible to increase convenience of a user, and a beverage is cooled or heated at a rapid time in the vehicle, thereby making it possible to increase salability.

For convenience in explanation and accurate definition in the appended claims, the terms lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling and heating cup holder comprising:
    a pair of holder bodies;
    a pair of thermoelectric elements having first and second surfaces for heat absorption and heat generation, the first surfaces being installed on the holder bodies;
    a pair of heat exchange pins to exchange heat with the second surfaces of the respective thermoelectric elements;
    a blower disposed at one side of the heat exchange pins and heat-radiating the heat exchange pins; and
    an extension heat pipe thermally interconnecting the second surfaces of the respective thermoelectric elements or thermally interconnecting the respective heat exchange pins.

2. The cooling and heating cup holder of claim 1, wherein the pair of heat exchange pins are spaced apart from each other by a predetermined distance, the extension heat pipe is disposed between the pair of heat exchange pins, and the extension heat pipe has a first end portion closely adhered to one of the pair of heat exchange pins, a bent central portion, and a second end closely adhered to the other of the pair of heat exchange pins.

3. The cooling and heating cup holder of claim 1, wherein one surface of the pair of heat exchange pins facing the thermoelectric elements is provided with the extension heat pipe traversing the respective heat exchange pins to thermally connect the respective heat exchange pins to each other, and the second surfaces of the respective thermoelectric elements are closely adhered to the extension heat pipe to thermally connect the respective thermoelectric elements to each other.

4. The cooling and heating cup holder of claim 1, further comprising a pair of transfer heat pipes having first ends connected to the second surfaces of the thermoelectric elements, extended, and having second ends connected to the heat exchange pins.

5. The cooling and heating cup holder of claim 4, wherein both ends of the extension heat pipe are connected to the respective transfer heat pipes.

6. A cooling and heating cup holder comprising:
    a pair of holder bodies;
    a pair of thermoelectric elements having first and second surfaces for heat absorption and heat generation, the first surfaces being installed on the holder bodies;
    a pair of heat exchange pins provided so as to exchange heat with the second surfaces of the respective thermoelectric elements;
    a blower disposed at one side of the heat exchange pins and heat-radiating the heat exchange pins;
    an extension heat pipe thermally interconnecting the second surfaces of the respective thermoelectric elements or thermally interconnecting the respective heat exchange pins;
    a pair of auxiliary thermoelectric elements provided in a space between the pair of holder bodies and having first surfaces closely adhered to the holder bodies adjacent thereto, respectively, and second surfaces disposed to face each other; and
    auxiliary heat pipes thermally connecting the second surfaces of the respective auxiliary thermoelectric elements and the respective heat exchange pins to each other.

7. The cooling and heating cup holder of claim 6, wherein sides of the pair of thermoelectric elements are provided with fans, respectively, and air blown from the fans is conditioned through the first surfaces of the thermoelectric elements and is then introduced into and convected in the holder bodies.

8. The cooling and heating cup holder of claim 6, further comprising a pair of transfer heat pipes having first ends respectively connected to the second surfaces of the thermoelectric elements, extended, and having second ends respectively connected to the heat exchange pins.

9. The cooling and heating cup holder of claim 8, wherein the second surfaces of the pair of thermoelectric elements are installed with heat radiation pins, respectively, the first ends of the transfer heat pipes are connected to the respective heat radiation pins, and both ends of the extension heat pipe are connected to the respective heat radiation pins.

10. The cooling and heating cup holder of claim 6, further comprising an auxiliary heat radiation pin disposed between the pair of auxiliary thermoelectric elements and having both sides closely adhered to the second surfaces of the auxiliary thermoelectric elements facing each other.

11. The cooling and heating cup holder of claim 10, wherein the auxiliary heat pipes are configured as a pair and have one ends connected to the auxiliary heat radiation pin and the other ends connected to the respective heat exchange pins.

12. The cooling and heating cup holder of claim 6, wherein an extension heat exchange pin is disposed between the pair of heat exchange pins.

\* \* \* \* \*